United States Patent [19]
Nakano

[11] Patent Number: 6,154,538
[45] Date of Patent: Nov. 28, 2000

[54] PORTABLE TELEPHONE APPARATUS

[75] Inventor: Rumi Nakano, Saitama, Japan

[73] Assignee: NEC Corporation, Tokyo, Japan

[21] Appl. No.: 09/082,560

[22] Filed: May 21, 1998

[30] Foreign Application Priority Data

May 23, 1997 [JP] Japan ................................. 9-134003

[51] Int. Cl.⁷ ................................................ H04M 11/00
[52] U.S. Cl. ........................ 379/387; 379/433; 455/575
[58] Field of Search .................................. 379/387, 424, 379/422, 433, 393; 455/575, 90

[56] References Cited

U.S. PATENT DOCUMENTS

| 5,884,156 | 6/1999 | Gordon | .................................... | 455/575 |
| 5,918,188 | 6/1999 | Doran | ...................................... | 455/575 |
| 5,956,398 | 9/1999 | Weadon et al. | ......................... | 379/433 |

FOREIGN PATENT DOCUMENTS

| 63-304753 | 12/1988 | Japan . | | |
| 1-119244 | 8/1989 | Japan . | | |
| 4-094842 | 8/1992 | Japan . | | |
| 5/183621 | 7/1993 | Japan . | | |
| 6-224986 | 8/1994 | Japan . | | |
| 7-038624 | 2/1995 | Japan . | | |
| 7-099535 | 4/1995 | Japan . | | |
| 407170226 | 12/1996 | Japan | ............................... | H04B 7/26 |
| 408335969 | 12/1996 | Japan | ............................... | H04M 1/10 |
| 2 222 747 | 9/1989 | United Kingdom . | | |
| 2 316 837 | 8/1997 | United Kingdom . | | |

*Primary Examiner*—Stella Woo
*Attorney, Agent, or Firm*—Scully, Scott, Murphy & Presser

[57] ABSTRACT

When the portable telephone apparatus receives a termination call and a call signal (or a ringing signal), the speaker generates a ringing tone. At this point, the user hears the ringing tone and holds the ear piece to his or her ear. At this point, the speaker impedance variation detecting portion detects the variation of the impedance corresponding to the variation of the volume of the space between the speaker and the ear piece. When the impedance variation detecting portion detects the variation of the impedance, it outputs an impedance variation detection signal. When the controlling portion receives the impedance variation detection signal, it performs a response process for the termination call or a hold cancel process for a call.

14 Claims, 2 Drawing Sheets

PORTABLE TELEPHONE APPARATUS

BACKGROUND OF THE INVENTION

1. Field of the Invention

The preset invention relates to a portable telephone apparatus, in particular, to a portable telephone apparatus that automatically enters into a response state or a call hold cancel state corresponding to the state that the user holds an ear piece of the apparatus to his or her ear.

2. Description of the Related Art

As a first related art reference of a conventional portable telephone apparatus, when the apparatus receives a call signal and the user operates a response button or a start button, the apparatus enters into a response state.

As a second related art reference disclosed as Japanese Patent Laid-Open Publication No. 5-183621, titled "Telephone Apparatus (translated title)" by Hiraiwa, the distance between a mouth piece (microphone) of the apparatus and the mouth of the user and the distance between an ear piece (speaker) of the apparatus and an ear of the user are measured by distance sensors. The volume level of the speaker of the apparatus and the input sensitivity of the microphone of the apparatus are controlled corresponding to the measured results.

As a third related art reference disclosed as Japanese Patent Laid-Open Publication No. 6-224986, titled "Mouth Piece and Ear Piece Apparatus (translated title)", by Toki, when the user holds the ear piece of the apparatus to his or her ear, a pressure sensor of the apparatus detects the state that the ear piece has contacted his or her ear and outputs a contact sense signal. A controlling portion of the apparatus raises the gain of an amplifier for a microphone corresponding to the contact sense signal.

As a fourth related art reference disclosed as Japanese Patent Laid-Open Publication No. 63-304753, titled "Telephone Apparatus", by Yofu, a call hold state is set or canceled corresponding to the state of a hook switch and information of the posture of an ear piece obtained by a speaker posture detecting means.

According to the first related art reference, when the apparatus receives a call signal and the user operates the response button or the like, the apparatus enters into the response state. Thus, to start talking over the telephone, before the user holds the ear piece of the apparatus to his or her ear, he or she should operate the response button or the like.

According to the second, third, and fourth related art references, the objects, structures, and operations thereof (in particular, objectives and controlling means of their detecting means (sensors)) are completely different from those of the present invention.

SUMMARY OF THE INVENTION

An object of the present invention is to provide a portable telephone apparatus that automatically enters into a response state corresponding to the state that the user just holds an ear piece to his or her ear without need to operate a start button or the like, thereby allowing the user to quickly talk over the telephone.

The present invention is a portable telephone apparatus, comprising a detecting means for detecting the state that the user has held an ear piece of the apparatus to his or her ear while the apparatus is receiving a call signal, and a controlling means for causing the apparatus to enter into a response state corresponding to a detection signal that is output from the detecting means.

The detecting means outputs the detection signal when the detecting means detects the state that the user has held the ear piece to his or her ear. The controlling means causes the apparatus to enter into a call hold cancel state corresponding to the detection signal.

The detecting means detects the variation of impedance due to the variation of the volume of a space between the ear piece and a speaker of the apparatus corresponding to the states before and after the user has held the ear piece to his or her ear and outputs the detection signal.

The apparatus has a speaker portion comprising a speaker, a speaker impedance variation detecting portion for detecting the variation of impedance corresponding to the variation of the volume of a space between the ear piece and the speaker corresponding to the state that the user has held the ear piece to his or her ear, and a controlling portion for performing a response process or a call hold cancel process corresponding to the detection signal that is output from the speaker impedance variation detecting portion.

The detecting means detects the variation of the sound capacitance of an opening portion of the ear piece corresponding to the state that the user has held the ear piece to his or her ear.

These and other objects, features and advantages of the present invention will become more apparent in light of the following detailed description of a best mode embodiment thereof, as illustrated in the accompanying drawings.

DESCRIPTION OF PREFERRED EMBODIMENT

First, the operation of the present invention will be described. According to the present invention, while the portable telephone apparatus is receiving a call signal or holding a call, when the apparatus detects the state that the user holds an ear piece of the apparatus to his or her ear, the apparatus automatically enters into a response state or a call hold cancel state.

Thus, when the user closes and holds the ear piece to his or her ear the apparatus automatically enters into the response state or call hold state without requiring the user to operate the response button or the like. Thus, the user can quickly start talking over the telephone.

Next, with reference to the accompanying drawings, an embodiment of the present invention will be described.

Figure 1:
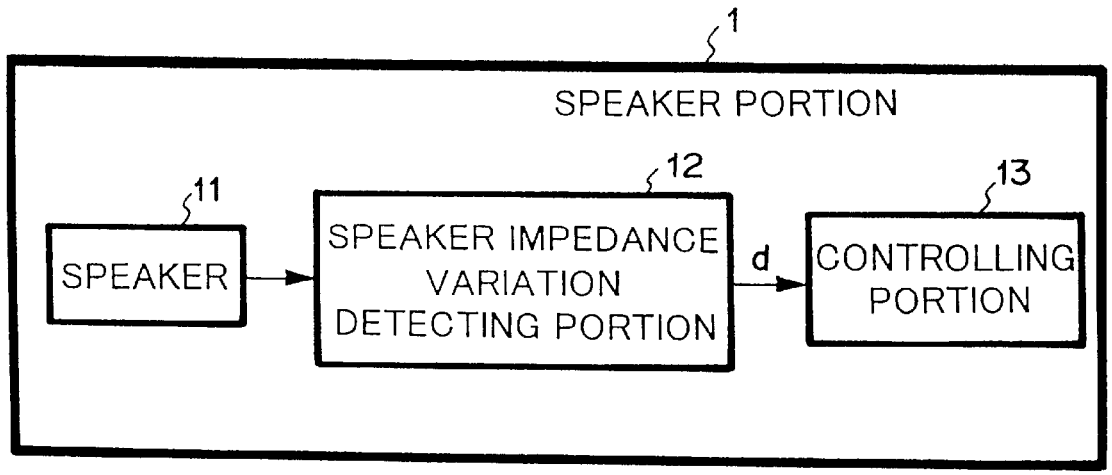
FIG. 1 is a functional block diagram showing a portable telephone apparatus according to an embodiment of the present invention.
Figure 2:
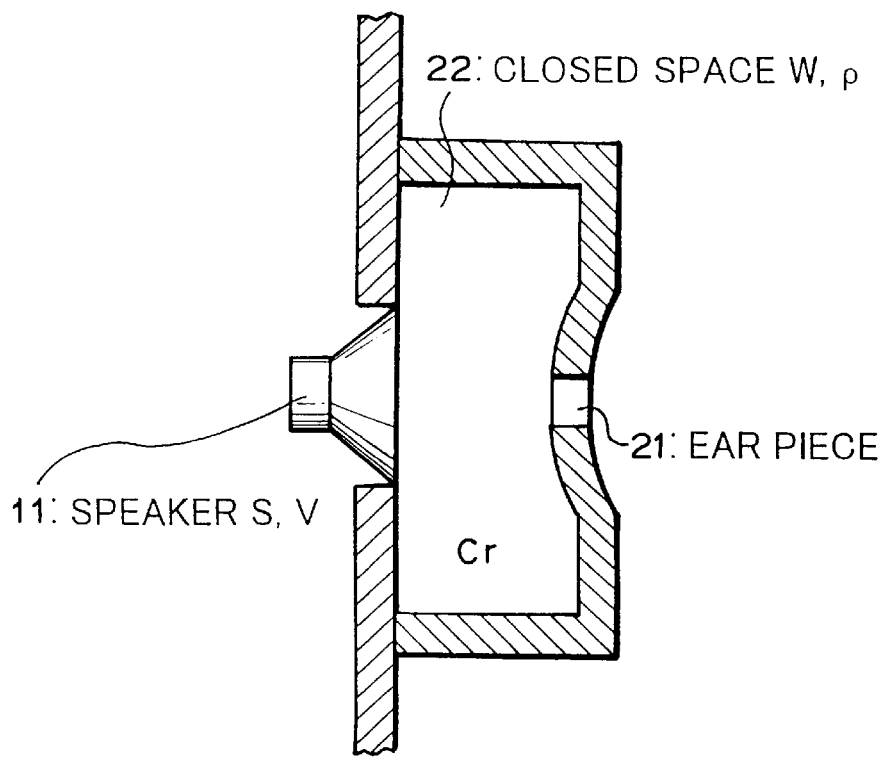
FIG. 2 is a partial sectional view of an ear piece for explaining a sound field of a speaker shown in FIG. 1.
Figure 3:
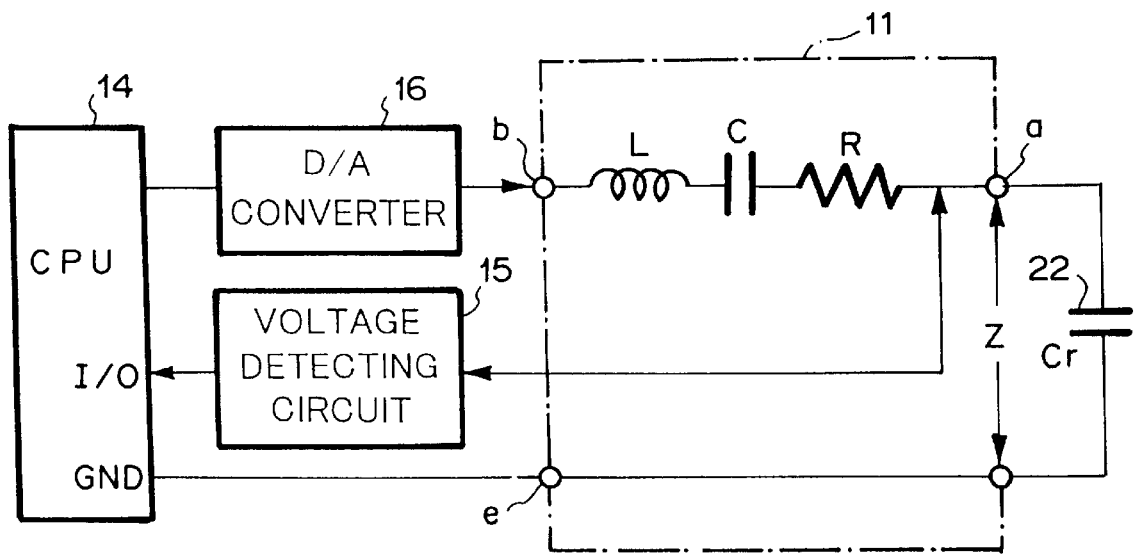
FIG. 3 is a circuit diagram equivalent to a speaker portion peripheral circuit shown in FIG. 2.

FIG. 1 is a functional block diagram showing a portable telephone apparatus according to the embodiment of the present invention. FIG. 2 is a partial sectional view showing a speaker is portion for explaining the sound field of a speaker. FIG. 3 is a circuit diagram equivalent to the speaker portion peripheral circuit shown in FIG. 2.

Referring to FIG. 2, the relation between a speaker 11 in the state that the user holds an ear piece to his or her ear and a space between the speaker 11 and the ear piece 21 can be expressed as a closed space 21 where the volume of the space and the sound capacity are denoted by W and Cr, respectively. The speaker 11 radiates a sound to the closed space 22.

Referring to FIG. 3 as the equivalent circuit diagram of the speaker portion, a sound pressure P of the speaker 11 and a sound capacity Cr of the closed space 22 are expressed by Eq. (1) and Eq. (2), respectively.

$$P = SV/\omega Cr \tag{1}$$

$$Cr = W/\rho c^2 \tag{2}$$

where W represents the volume of the space; Cr represents the sound capacity; P represents the sound pressure; S represents the area of a vibrating plate; V represents the velocity of the vibrating plate; $\omega$ represents the angular frequency; $\rho$ represents the air density; and c represents the sound velocity.

With Eq. (1) and Eq. (2), it is clear that the sound pressure P of the speaker 11 is reversely proportional to the volume W of the space.

The impedance Z of the speaker 11 can be expressed by Eq. (3).

$$Z = R + j\,(\omega L - 1/\omega(C + Cr)) \tag{3}$$

where R represents a resistance component; L represents an inductance component; and C represents a capacitance component. Thus, corresponding to the variation of the space volume of the speaker portion 1, the value of the sound capacity Cr and thereby the impedance Z vary. The variation of the impedance Z is measured as shown in FIG. 3. When the user holds the ear piece to his or her ear, the sound capacity Cr varies to a small sound capacitance Cr'. A CPU 14 that controls a controlling portion and a signal processing portion of the portable telephone apparatus outputs a digital value corresponding to a DC voltage. A D/A converter 16 converts the DC voltage into an AC voltage and supplies the AC voltage to the speaker 11. A voltage detecting circuit 15 detects the level at terminal a of the speaker 11. The level at the terminal a is equivalent to an output of the speaker 11. When the user holds the ear piece 21 to his or her ear, the sound capacity Cr varies to Cr'. Thus, the CPU 14 determines that the user has held the ear piece 21 to his or her ear corresponding to the detected voltage. Thereafter, the CPU 14 performs a predetermined operation corresponding to a program shored in the apparatus.

According to the embodiment of the present invention, in consideration of the fact that the variation of the volume of the space of the speaker 11 causes the impedance Z to vary, the apparatus detects the state that the user has held the ear piece 21 to his or her ear corresponding to the variation of the impedance Z and automatically enters into the response state or call hold cancel state corresponding to the detection signal.

In the embodiment, the impedance was detected with a DC voltage. Alternatively, an AC voltage that has a constant amplitude in a low range or a high range is supplied to terminal b of the speaker 11. An AC voltage at the terminal a of the speaker 11 is detected. Thus, the CPU 14 can determine whether or not the user has held the ear piece 21 of the speaker 11 to his or her ear corresponding to the variation of the AC voltage detected by the voltage detecting circuit 15.

Referring to FIG. 1, the speaker portion 1 of the portable telephone apparatus according to the embodiment comprises the speaker 11, the speaker impedance variation detecting portion 12, and the response controlling portion 13. The speaker impedance variation detecting portion 12 detects the variation of the impedance corresponding to the variation of the volume of the space formed between the speaker 11 and the ear piece 21 in the state that the user has held the ear piece 21 to his or her ear. The response controlling portion 13 performs a response process corresponding to the detection signal detected by the speaker impedance variation detecting portion 12.

Next, with reference to FIGS. 1 and 4, the operation of the embodiment will be described.

Figure 4:
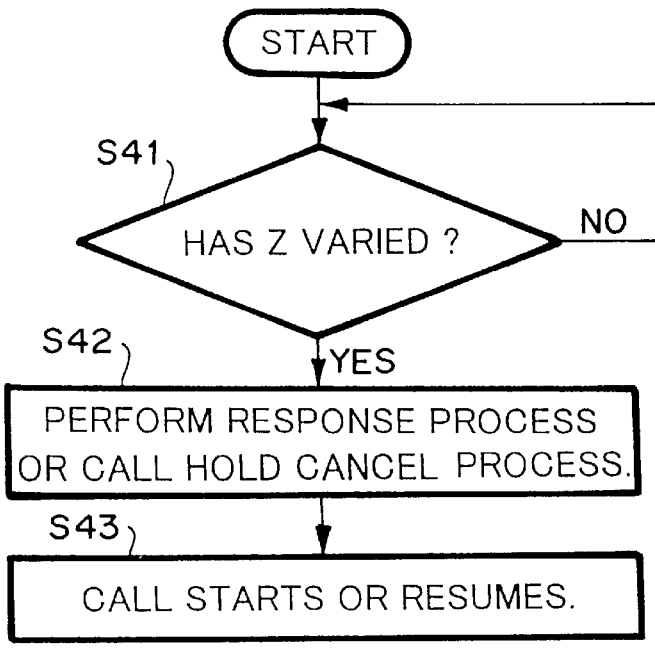
FIG. 4 is a flow chart for explaining the operation of the embodiment shown in FIG. 1.

FIG. 4 is a flow chart for explaining the operation of the embodiment shown in FIG. 1.

When the portable telephone apparatus receives a termination call and a call signal (or a ringing signal), the speaker 11 generates a ringing tone. At this point, the user hears the ringing tone and holds the ear piece 21 to his or her ear. Alternatively, the user holds the ear piece 21 to his or her ear while the portable telephone apparatus is holding a call.

At this point, the speaker impedance variation detecting portion 12 detects the variation of the impedance Z corresponding to the variation of the volume of the space between the speaker 11 and the ear piece 21. When the determined result at step S41 is Yes, the speaker impedance variation detecting portion 12 outputs an impedance variation detection signal d.

When the controlling portion 13 receives the impedance variation detection signal d, it performs a response process for the termination call or a hold cancel process for a call (at step S42). In other words, the controlling portion 13 performs the same process as the operation of the response button or start button.

Thus, the user can start talking over the telephone or resume the talking (at step S43).

As described above, the portable telephone apparatus according to the present invention comprises a detecting means for detecting the state that the user has held an ear piece of the apparatus to his or her ear while the apparatus is receiving a call signal, and a controlling means for causing the apparatus to enter into a response state corresponding to a detection signal that is output from the detecting means. The detecting means outputs the detection signal when the detecting means detects the state that the user has held the ear piece to his or her ear. The controlling means causes the apparatus to enter into a call hold cancel state corresponding to the detection signal. The detecting means detects the variation of impedance due to the variation of the volume of a space between the ear piece and a speaker of the apparatus corresponding to the states before and after the user has held the ear piece to his or her ear and outputs the detection signal. The apparatus has a speaker portion comprising a speaker, a speaker impedance variation detecting portion for detecting the variation of impedance corresponding to the variation of the volume of a space between the ear piece and the speaker corresponding to the state that the user has held the ear piece to his or her ear, and a controlling portion for performing a response process or a call hold cancel process corresponding to the detection signal that is output from the speaker impedance variation detecting portion. The detecting means detects the variation of the sound capacitance of an opening portion of the ear piece corresponding to the state that the user has held the ear piece to his or her ear. Thus, when the user holds the ear piece to his or her ear, the portable telephone apparatus automatically enters into a response state or call hold cancel state. Consequently, the user can quickly start taking over the telephone or resume the talking.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A portable telephone apparatus, comprising:

detecting means for detecting a state that a user has closed an ear piece of a speaker to the user's ear while the apparatus is receiving a call signal;

speaker impedance variation detection means for detecting an electrical variable impedance corresponding to a variation of a volume of a space formed between the speaker while the apparatus is receiving a call signal; and controlling means for causing the apparatus to enter into a response state upon detection of a signal that is output from said impedance variation detecting means.

2. The portable telephone apparatus as set forth in claim 1, wherein said detecting means outputs the detection signal when said detecting means detects the state that the user has closed the ear piece to his or her ear, and wherein said controlling means causes the apparatus to enter into a call hold cancel state corresponding to the detection signal.

3. The portable telephone apparatus as set forth in claim 2, wherein said detecting means detects the variation of impedance due to the variation of the volume of a space between the ear piece and a speaker of the apparatus corresponding to the states before and after the user has closed the ear piece to his or her ear and outputs the detection signal.

4. The portable telephone apparatus as set forth in claim 2, wherein the apparatus has a speaker portion, the speaker portion comprises:

a speaker;

a speaker impedance variation detecting portion for detecting the variation of impedance corresponding to the variation of the volume of a space between the ear piece and said speaker corresponding to the state that the user has held the ear piece to his or her ear; and a controlling portion for performing a response process or a call hold cancel process corresponding to the detection signal that is output from said speaker impedance variation detecting portion.

5. The portable telephone apparatus as set forth in claim 2, wherein said detecting means detects the variation of the sound capacitance of an opening portion of the ear piece corresponding to the state that the user has held the ear piece to his or her ear.

6. The portable telephone apparatus as set forth in claim 1, wherein said detecting means detects the variation of the sound capacitance of an opening portion of the ear piece corresponding to the state that the user has held the ear piece to his or her ear.

7. The portable telephone apparatus as set forth in claim 6, wherein said controlling means causes the apparatus to enter into a call hold cancel state corresponding to the detection signal.

8. The portable telephone apparatus as set forth in claim 1, further comprising:

a voltage detecting circuit for detecting a level at a terminal of the speaker; and a D/A converter for converting a DC voltage into an AC voltage and supplying the AC voltage to the speaker, wherein after said D/A converter supplies the AC voltage to the speaker and said voltage detecting circuit detects the level, the electrical variable impedance is detected by said speaker impedance variation detecting means.

9. A portable telephone apparatus including an ear piece and a speaker, comprising:

detecting means for detecting a state wherein a user has closed the ear piece of the apparatus to the user's ear while the apparatus is receiving a call signal; and controlling means for causing the apparatus to enter into a response state upon a detection signal output from the detecting means, wherein said detecting means detects a variation of impedance due to a variation of a volume of a space between the ear piece and the speaker of the apparatus corresponding to the states before and after the user has closed the ear piece to the user's ear and outputs the detection signal.

10. The portable telephone apparatus as set forth in claim 9, wherein said controlling means causes the apparatus to enter into a call hold cancel state corresponding to the detection signal.

11. The portable telephone apparatus as set forth in claim 10, wherein the apparatus has a speaker portion, the speaker portion comprises:

a speaker;

a speaker impedance variation detecting portion for detecting the variation of impedance corresponding to the variation of the volume of a space between the ear piece and said speaker corresponding to the state that the user has held the ear piece to his or her ear; and a controlling portion for performing a response process or a call hold cancel process corresponding to the detection signal that is output from said speaker impedance variation detecting portion.

12. The portable telephone apparatus as set forth in claim 10, wherein said detecting means detects the variation of the sound capacitance of an opening portion of the ear piece corresponding to the state that the user has held the ear piece to his or her ear.

13. A portable telephone apparatus including an ear piece and a speaker, comprising:

detecting means for detecting a state wherein a user has closed the ear piece of the apparatus to the user's ear while the apparatus is receiving a call signal; and controlling means for causing the apparatus to enter into a response state upon a detection signal output from the detecting means, wherein the detecting means comprise a speaker portion, which speaker portion comprises a speaker, a speaker impedance variation detecting portion for detecting a variation of impedance corresponding to the variation of the volume of a space between the ear piece and said speaker corresponding to the state in which the user has held the ear piece to the user's ear; and a controlling portion for performing one of: a response process and a call hold cancel process, the processes corresponding to the detection signal that is output from said speaker impedance variation detecting portion.

14. The portable telephone apparatus as set forth in claim 13, wherein said controlling means causes the apparatus to enter into a call hold cancel state corresponding to the detection signal.

* * * * *